United States Patent
Piyabongkarn et al.

(10) Patent No.: US 9,472,954 B2
(45) Date of Patent: Oct. 18, 2016

(54) GENERATOR DISPATCHING OR LOAD SHEDDING CONTROL METHOD AND SYSTEM FOR MICROGRID APPLICATIONS

(71) Applicant: EATON CORPORATION, Cleveland, OH (US)

(72) Inventors: Damrongrit Piyabongkarn, Medina, MN (US); Edward F. Buck, Waldo, WI (US); Steven A. Dimino, Wauwatosa, WI (US)

(73) Assignee: EATON CORPORATION, Cleveland, OH (US)

( * ) Notice: Subject to any disclaimer, the term of this patent is extended or adjusted under 35 U.S.C. 154(b) by 503 days.

(21) Appl. No.: 14/028,620

(22) Filed: Sep. 17, 2013

(65) Prior Publication Data

US 2014/0097683 A1 Apr. 10, 2014

Related U.S. Application Data

(60) Provisional application No. 61/710,905, filed on Oct. 8, 2012.

(51) Int. Cl.
*H02J 1/00* (2006.01)
*H02J 3/00* (2006.01)
(Continued)

(52) U.S. Cl.
CPC .. *H02J 3/38* (2013.01); *H02J 3/04* (2013.01); *H02J 3/32* (2013.01); *H02J 3/381* (2013.01);
(Continued)

(58) Field of Classification Search
CPC ............... H02J 3/38; H02J 3/46; H02J 3/06; Y10T 307/718
USPC .......................................................... 307/84
See application file for complete search history.

(56) References Cited

U.S. PATENT DOCUMENTS

| 4,305,129 A | 12/1981 | Yannone et al. | |
|---|---|---|---|
| 5,949,153 A * | 9/1999 | Tison | H02J 3/24 307/18 |

(Continued)

FOREIGN PATENT DOCUMENTS

| CN | 101976851 A | 2/2011 |
|---|---|---|
| CN | 102122819 A | 7/2011 |

(Continued)

OTHER PUBLICATIONS

European Patent Office, "International Search Report and Written Opinion", Jul. 22, 2014, 12 pp.

(Continued)

*Primary Examiner* — Carlos Amaya
(74) *Attorney, Agent, or Firm* — Eckert Seamans Cherin & Mellott, LLC; Philip E. Levy; Kirk D. Houser

(57) ABSTRACT

A microgrid power generation system includes a plurality of generators having a plurality of different rated capacities and a plurality of distribution nodes, at least some of the distribution nodes being powered by the generators. A grid is formed by the distribution nodes, the grid includes a system frequency. A plurality of loads are powered by the grid through the distribution nodes, the loads have a power demand. A processor includes a plurality of efficiency bands, each of the efficiency bands being for a corresponding one of the generators and including a plurality of generator switching points based upon droop of the system frequency and the power demand of the loads. The processor is structured to operate the generators and the loads under transient conditions based upon the efficiency bands.

15 Claims, 9 Drawing Sheets

(51) Int. Cl.
  *H02J 3/38* (2006.01)
  *H02J 3/04* (2006.01)
  *H02J 3/32* (2006.01)
  *H02J 3/46* (2006.01)

(52) U.S. Cl.
  CPC ............... *H02J 3/382* (2013.01); *H02J 3/46* (2013.01); *Y02E 70/30* (2013.01); *Y10T 307/305* (2015.04); *Y10T 307/367* (2015.04); *Y10T 307/718* (2015.04)

(56) References Cited

U.S. PATENT DOCUMENTS

| | | |
|---|---|---|
| 7,116,010 B2 | 10/2006 | Lasseter et al. |
| 7,715,950 B2 | 5/2010 | Lasseter et al. |
| 7,787,272 B2 | 8/2010 | Lasseter et al. |
| 7,920,942 B2 | 4/2011 | Lasseter et al. |
| 7,932,637 B2 | 4/2011 | Lasseter et al. |

FOREIGN PATENT DOCUMENTS

| | | |
|---|---|---|
| JP | 2006-320082 A | 11/2006 |
| WO | 01/61820 A1 | 8/2001 |
| WO | 2007/052349 A1 | 10/2007 |
| WO | 2012/058114 A2 | 5/2012 |

OTHER PUBLICATIONS

Aktarujjaman, M., et al., "Control Stabilisation of an Islanded System with DFIG Wind Turbine", IEEE, First International Power and Energy Conference, Nov. 28-29, 2006, pp. 312-317.

Jeon, J., et al., Unified Compensation Control of a Hybrid Energy Storage System for Enhancing Power quality and Operation Efficiency in a Diesel and Wind-Turbine Based Stand-alone Microgrid, 3rd IEEE International Symposium on Power Electronics for Distributed Generation Systems (PEDG), 2012, pp. 264-270.

Ninad, N., et al., "Per-Phase DQ Control of a Three-Phase Battery Inverter in a Diesel Hybrid Mini-Grid Supplying Single-Phase Loads", IEEE, 2011, pp. 204-209.

Tian, S., et al., "The Control Strategy Based on Improved Droop Method of Microgrid-Connected Inverters", IEEE, 2010 International Conference on Electrical and Control Engineering, 2010, pp. 5700-5703.

Guerrero, J., et al., "Advanced Control Architectures for Intelligent Microgrids-Part II: Power Quality, Energy Storage, and AC/DC Microgrids", IEEE Transactions on Industrial Electronics, vol. 60, No. 4, Apr. 2013, pp. 1263-1270.

Ito, Y., et al., "A Control Method for Small-Scale DC Power Systems Including Distributed Generators", Electrical Engineering in Japan, vol. 167, No. 2, 2009, pp. 86-93.

Chung, I., et al., "Control parameter optimization for multiple distributed generators in a microgrid using particle swarm optimization", Special Issue Article, http://onlinelibrary.wiley.com/doi/10.1002/etep.424/full, 2010, 27 pp.

D. Gao et al., "Energy management strategy based on fuzzy logic for a fuel cell hybrid bus", Journal of Power Sources, 185(1), Oct. 2008, pp. 311-317.

Z. Jiang et al, "Design and experimental tests of control strategies for active hybrid fuel cell/battery power sources", Journal of Power Sources, 130(1), May 2004, pp. 163-171.

M. Uzunoglu et al., "Modeling, control and simulation of a PV/FC/UC based hybrid power generation system for stand-alone applications", Renewable Energy, 34(3), Mar. 2009, pp. 509-520.

A. Hajizadeh et al., "Intelligent power management strategy of hybrid distributed generation system", International Journal of Electrical Power & Energy Systems, 29(10), Dec. 2007, pp. 783-795.

G. Tina et al., "Hybrid solar/wind power system probabilistic modelling for long-term performance assessment", Solar Energy, 80(5), May 2006, pp. 578-588.

Z. Jiang, "A Multi-Agent Based Power Sharing Scheme for Hybrid Power Sources", Vehicle Power and Propulsion Conference, VPPC 2007, IEEE, 2007, pp. 7-11.

J. Lagorse et al., "A multi-agent system for energy management of distributed power sources", Renewable Energy, 35(1), Jan. 2010, pp. 174-182.

A. Del Real et al., "Hybrid Model Predictive Control of a Two-Generator Power Plant Integrating Photovoltaic Panels and a Fuel Cell", 46th IEEE Conference on Decision and Control, Dec. 2007, pp. 5447-5452.

A. Bemporad et al., "Control of systems integrating logic, dynamics, and constraints", Automatica 35, Mar. 1999, pp. 407-427.

P. Julian et al., "Canonical Piecewise-Linear Approximation of Smooth Functions", IEEE Transactions on Circuits and Systems, I: Fundamental Theory and Applications, vol. 45, No. 5, May 1998, pp. 567-571.

F. Borrelli et al., "Dynamic programming for constrained optimal control of discrete-time linear hybrid systems", Automatica 41, 2005, pp. 1709-1721.

G. Ferrari-Trecate et al., "Moving Horizon Estimation for Hybrid Systems", IEEE Transactions on Automatic Control, vol. 47, No. 10, Oct. 2002, pp. 1663-1676.

\* cited by examiner

GENERATOR DISPATCHING OR LOAD SHEDDING CONTROL METHOD AND SYSTEM FOR MICROGRID APPLICATIONS

CROSS-REFERENCE TO RELATED APPLICATION

This application claims priority from and claims the benefit of U.S. Provisional Patent Application Ser. No. 61/710,905, filed Oct. 8, 2012, which is incorporated by reference herein.

BACKGROUND

1. Field

The disclosed concept pertains generally to power generation systems and, more particularly, to microgrids, such as, for example, distributed generation power systems. The disclosed concept further pertains to generator dispatching control methods for microgrids. The disclosed concept also pertains to load shedding control methods and systems.

2. Background Information

Fuel consumption and power reliability are two major concerns for power generation applications. In order to have a robust solution, the trend in power generation systems is developing toward distributed generation (DG) which includes conventional grid connect, conventional fossil fuel generation and renewable energy resources.

A typical approach for generator dispatching is to add or turn off a generator based on frequency droop characteristics of plural generators as a function of the grid load level in order to maintain system power reliability. As shown in FIG. 1, generator dispatching frequency thresholds are typically set within a normal load range. However, this approach does not always guarantee maximum efficiency and is not scalable for relatively larger intelligent distributed power generation systems. Moreover, if renewable energy resources are used, then the control strategy needs to be robust in order to provide desired flexibility.

In the generator dispatching control strategy of FIG. 1, which does not use an energy storage system, plot 2 is for both 30 kW and 60 kW generators (not shown) being on, while plot 4 is for only the 60 kW generator (not shown) being on. The plots 2,4 show per unit (pu) frequency (f) on the vertical axis and power output (kW and per unit power) on the horizontal axis. In the plot 2, when the power output decreases to 27 kW, or the frequency increases to 0.994 pu, the 30 kW generator is turned off at 6. Later, when the power output increases to 48 kW in plot 4, or the frequency decreases to 0.984 pu, the 30 kW generator is turned on at 8. The 60 kW generator keeps running as a master generator, turns on the 30 kW generator when the load exceeds a suitable threshold (e.g., without limitation, 80% of 60 kW), and turns off the 30 kW generator when load is below a suitable threshold (e.g., without limitation, 30% of 90 kW).

FIG. 2 illustrates demand dispatching through a simulation. The plotted signals represent the system frequency that is drooping based on a simulated load and based on the capacity slope of the operating generator. The dotted line is an indication of the operating state of a supporting generator. When the dotted line is "high" on the plot, a second supporting generator is online. When the dotted line is "low", the second supporting generator is offline. At about time 3.0 a significant load step occurs. This load step draws greater power than the prescribed limit for the single operating generator. Additional generation is then applied causing the frequency to recover. At about time 7.0, the excess load is removed and the frequency begins to recover forcing the additional generation to turn off. As the transient from the load step continues, the frequency droops at 10 below the transition threshold and the additional generation is reapplied. After the frequency settles, following the load step transient, the additional generation is again commanded offline.

Hence, there is a need to prevent this generator cycling issue.

There is room for improvement in microgrids, such as, for example, distributed generation power systems.

There is also room for improvement in generator dispatching control methods for microgrids.

There is further room for improvement in load shedding control methods for microgrids.

SUMMARY

These needs and others are met by aspects of the disclosed concept.

As one aspect of the disclosed concept, a generator dispatching control method for a microgrid comprises: employing a plurality of generators having a plurality of different rated capacities; employing a plurality of distribution nodes; powering at least some of the distribution nodes by the generators; forming a grid by the distribution nodes, the grid including a system frequency; powering a plurality of loads by the grid through the distribution nodes, the loads having a power demand; operating by a processor the generators and the loads under transient conditions based upon a plurality of efficiency bands; and employing each of the efficiency bands for a corresponding one of the generators, each of the efficiency bands including a plurality of generator switching points based upon droop of the system frequency and the power demand of the loads.

As another aspect of the disclosed concept, a microgrid power generation system comprises: a plurality of generators having a plurality of different rated capacities; a plurality of distribution nodes, at least some of the distribution nodes being powered by the generators; a grid formed by the distribution nodes, the grid including a system frequency; a plurality of loads powered by the grid through the distribution nodes, the loads having a power demand; and a processor including a plurality of efficiency bands, each of the efficiency bands being for a corresponding one of the generators and including a plurality of generator switching points based upon droop of the system frequency and the power demand of the loads, the processor being structured to operate the generators and the loads under transient conditions based upon the efficiency bands.

As another aspect of the disclosed concept, a load shedding control method for a microgrid comprises: employing a plurality of generators; employing a plurality of distribution nodes; powering at least some of the distribution nodes by the generators; forming a grid by the distribution nodes, the grid including a system frequency; powering a plurality of loads by the grid through the distribution nodes; and measuring the system frequency of the grid, comparing the measured system frequency to a frequency threshold, and responsively shedding by a processor a number of the loads from the grid or prohibiting additional load to the grid.

As another aspect of the disclosed concept, a load shedding system comprises: a plurality of generators; a plurality of distribution nodes, at least some of the distribution nodes being powered by the generators; a grid formed by the distribution nodes, the grid including a system frequency; a plurality of loads powered by the grid through the distribution nodes; and a processor including a frequency-based load shedding routine structured to measure the system frequency of the grid, compare the measured system frequency to a frequency threshold, and responsively shed a number of the loads from the grid or prohibit additional load to the grid.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "processor" shall mean a programmable analog and/or digital device that can store, retrieve, and process data; a control; a controller; an intelligent distribution manager; a computer; a workstation; a personal computer; a microprocessor; a microcontroller; a microcomputer; a central processing unit; a mainframe computer; a mini-computer; a server; a networked processor; or any suitable processing device or apparatus.

As employed herein, the term "microgrid" shall mean a MicroGrid, a SmartGrid, distributed generation (DG), on-site generation, dispersed generation, embedded generation, decentralized generation, decentralized energy or distributed energy, which generates electricity from a plurality of the same or different energy sources. Non-limiting examples of such energy sources include diesel generation, wind energy, solar energy, and energy storage systems, such as a number of batteries that are electrically connected to other energy sources by a bi-directional DC/AC inverter. Although not required, a microgrid can allow collection of energy from relatively many energy sources and may give lower environmental impacts and improved security of power supply. Typically, although not required, a microgrid is islanded or electrically disconnected from a utility grid.

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

The disclosed concept is described in association with diesel generation, although the disclosed concept is applicable to a wide range of energy sources for a microgrid.

Figure 1:
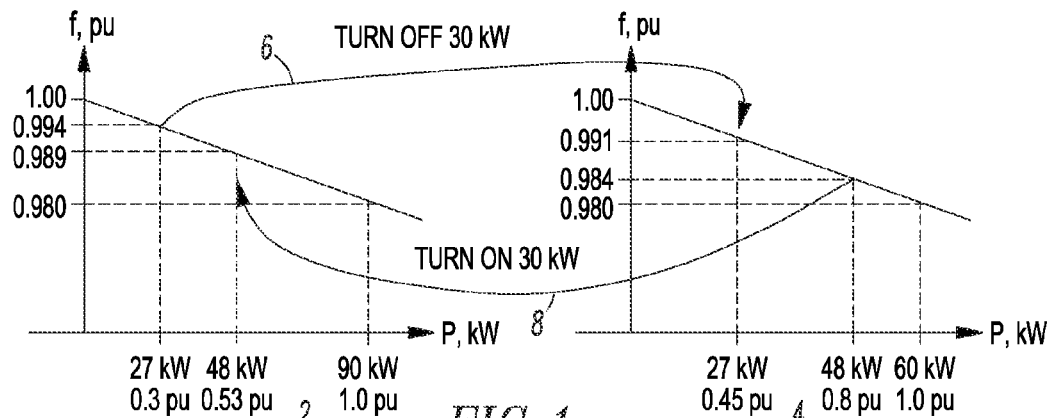
FIG. 1 is a plot of generator per unit frequency versus power for two configurations of 30 kW and 60 kW generators, and a single 60 kW generator including transitions between the two configurations.
Figure 2:
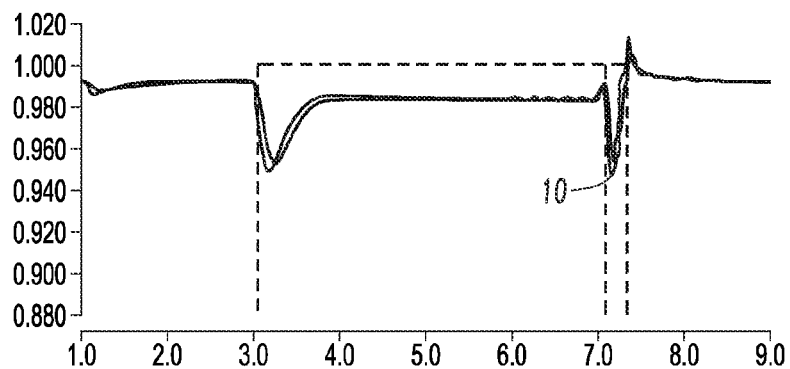
FIG. 2 is a plot of simulated system per unit frequency versus time for various loads and transitions between two generator operating states.
Figure 3:
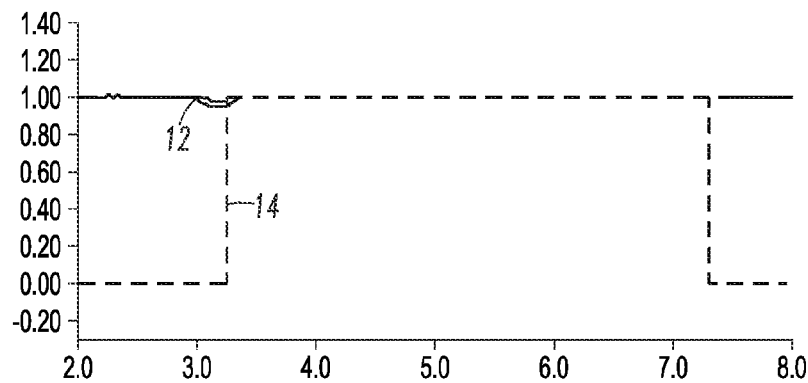
FIG. 3 is a plot of simulated system per unit frequency versus time for various loads and transitions between two generator operating states in accordance with embodiments of the disclosed concept.

In FIG. 2, the unstable response to the load transient can be mitigated with an appropriate delay. FIG. 3 shows a frequency response at 12 to a load transient, but with a suitable delay to prevent generator cycling. Like FIG. 2, the same load transient occurs at about time 3.0, as shown by the dotted line at 14, and the additional generation is brought online. Later, at about time 7.0, the load transitions offline, but the transient doesn't cause the additional generation to go offline until the transient is over and the frequency has stabilized. This eliminates the undesired generator cycling that was discussed above in connection with FIG. 2. As the number of sources and loads are increased, a suitable delay time is needed to prevent undesired cycling.

FIG. 2 is a simple simulation that illustrates frequency response to a relatively large load transient. Any substantial load may have the effect of drooping the frequency to a level that causes additional generation to be brought online. The plot indicates the potential for load transients to cause generators to start and stop undesirably. To prevent the errant starting of generators in response to load transients, a suitable response delay is applied to the source and load management. This response provides time for the frequency to "settle" at a new operating point before additional generation is brought on line. For contingencies where the frequency droops at a relatively high rate from an overload or another power system fault, the disclosed concept provides load management that sheds loads in order to prevent system collapse. Reconnection of loads is performed following frequency recovery in a corresponding suitable manner to ensure the system can provide service without instability.

The disclosed concept provides a control strategy for distributed generators in order to provide maximum fuel efficiency while maintaining power reliability of an energy storage system. The disclosed systems employ demand-based dispatching and can be extended to cover all loading levels for maximum energy efficiency. An increase in reliability or power quality can be obtained by operating plural power sources and loads autonomously in transient conditions, namely, when the system is disturbed in the microgrid.

A frequency-based load shedding algorithm for a microgrid operating in an islanded mode is also disclosed. This employs frequency droop for real power sharing. This algorithm implements emergency (e.g., a number of loads are shed immediately in order to prevent a number of generators from stalling), as well as non-emergency, load shedding, and addresses differences in frequency-based load shedding for a utility application versus a microgrid application.

Example 1

Diesel generation, for example, runs at maximum fuel efficiency when operated at rated power. Hence, in order to maximize overall system fuel efficiency, diesel DG needs to be operated at or near its nominal load rating as often as possible. There are two primary strategies available to accomplish this goal from a microgrid control architecture: (1) generator dispatching; and (2) peak shaving of generators. The efficiency bands disclosed herein are intended to provide the highest operational efficiency for diesel DG sourcing power to the microgrid, while ensuring reserve capacity in the diesel DG or a battery interface module (BIM) when connected to prevent a contingency from overloading the running diesel DG from an unanticipated surge in demand.

Example 2

A BIM is, for example, a three-phase, four-wire grid tie inverter rated for the continuous capacity of the corresponding energy storage system (e.g., without limitation, rated at 6 kWH), and a transient capacity of the diesel DG that it is paired with. The BIM interfaces an energy storage system with the microgrid by providing equivalent voltage, frequency and phase of the diesel DG sourced power. The BIM functions as a complementary source for peak shaving for the diesel DG by adding transient demand power when the diesel DG is running near 100% capacity. This allows continued operation at the highest diesel DG efficiency for a relatively short time without transferring the demand to a higher rated diesel DG running at less than capacity and incurring additional losses in efficiency. At extreme low demand, the BIM is available to assume sourcing for the entire microgrid, thereby allowing the diesel DG to cycle off. This allows for the stored energy accumulated during power cycling to be used in lieu of the diesel DG continuing to burn fuel at a relatively very low efficiency.

Example 3

Generator dispatching consists of having just the right amount of diesel DG operating on the system to ensure that the generation capacity and load demands are balanced at any given time. This strategy implies that diesel DG of different ratings are on stand-by to be turned on or off as needed based on the present load demand. To have the effective control for stable and efficient paralleling of widely distributed diesel DG, voltage and frequency droop control is employed as modified by the use of efficiency bands as will be described.

Example 4

The second source management strategy consists of peak shaving the generators on the system such that the diesel DG operate at or close to 100% load when active, supplying the load and charging an energy storage system simultaneously, and then turning off the diesel DG and supplying the loads from the energy storage system. Additional diesel DG may run in parallel to meet the demand beyond the capacity of the energy storage system. This strategy ensures that anytime a diesel DG is turned on, it is operated at or close to rated capacity. The efficiency bands for the running diesel DG are modified dynamically based the availability of the microgrid-tied energy storage system. Based on the efficiency bands, the energy storage system will support the running diesel DG to delay starting additional units as well as supporting transient peak load. In cases where the load exceeds the capacity of the running diesel DG, the energy storage system will carry the additional load while higher diesel DG capacity is brought online.

Example 5

Figure 4:
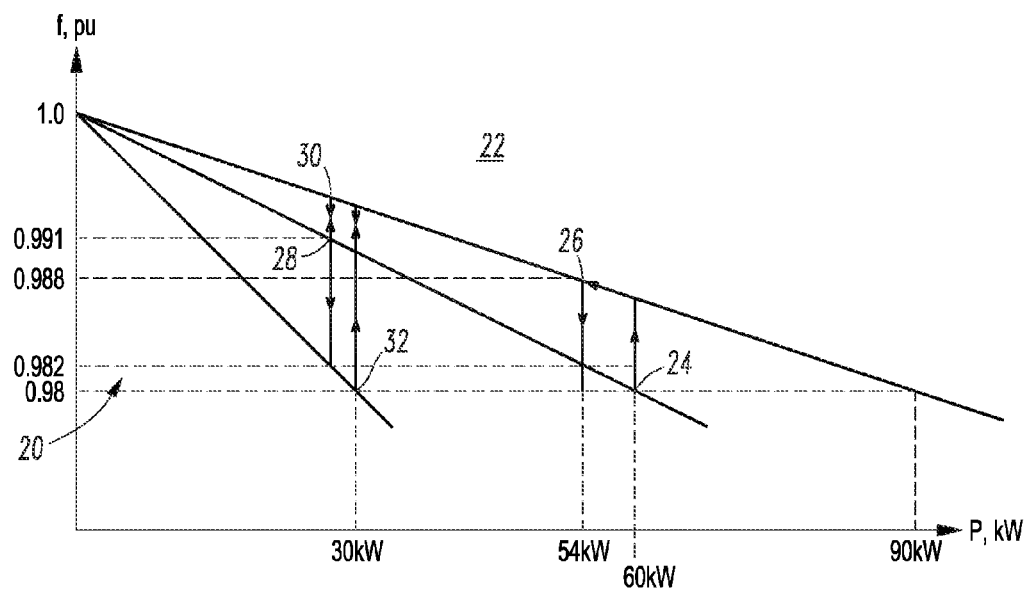
FIG. 4 is a plot of generator per unit frequency versus power for 30 kW and 60 kW generators for which control logic with multiple dispatching points, but without an energy store, is employed in accordance with another embodiment of the disclosed concept.

The control logic of the system includes a plurality of switching points to keep plural generators running close to the highest efficiency operating region (e.g., without limitation, an example 90% efficiency band 20 is shown in FIG. 4 for both of the example 30 kW and 60 kW generators (not shown)). The plot 22 shows the results of control logic with multiple dispatching points, but without an energy store.

For example, as shown at 24, the 30 kW generator is turned on at 100% of the rating of the 60 kW generator (i.e., 60 kW in this example). Then, the 30 kW generator is turned off, at 26, when the load is at 90% of the rating of the 60 kW generator alone (i.e., 54 kW in this example). At somewhat less than 30 kW (e.g., 27 kW in this 90% efficiency band example), the 30 kW generator is turned on, at 28, and after a predetermined time (e.g., without limitation, 3 seconds), the 60 kW generator is turned off at 30. When the load increases to 30 kW, the 60 kW generator is turned on, at 32.

Example 6

Figure 5:
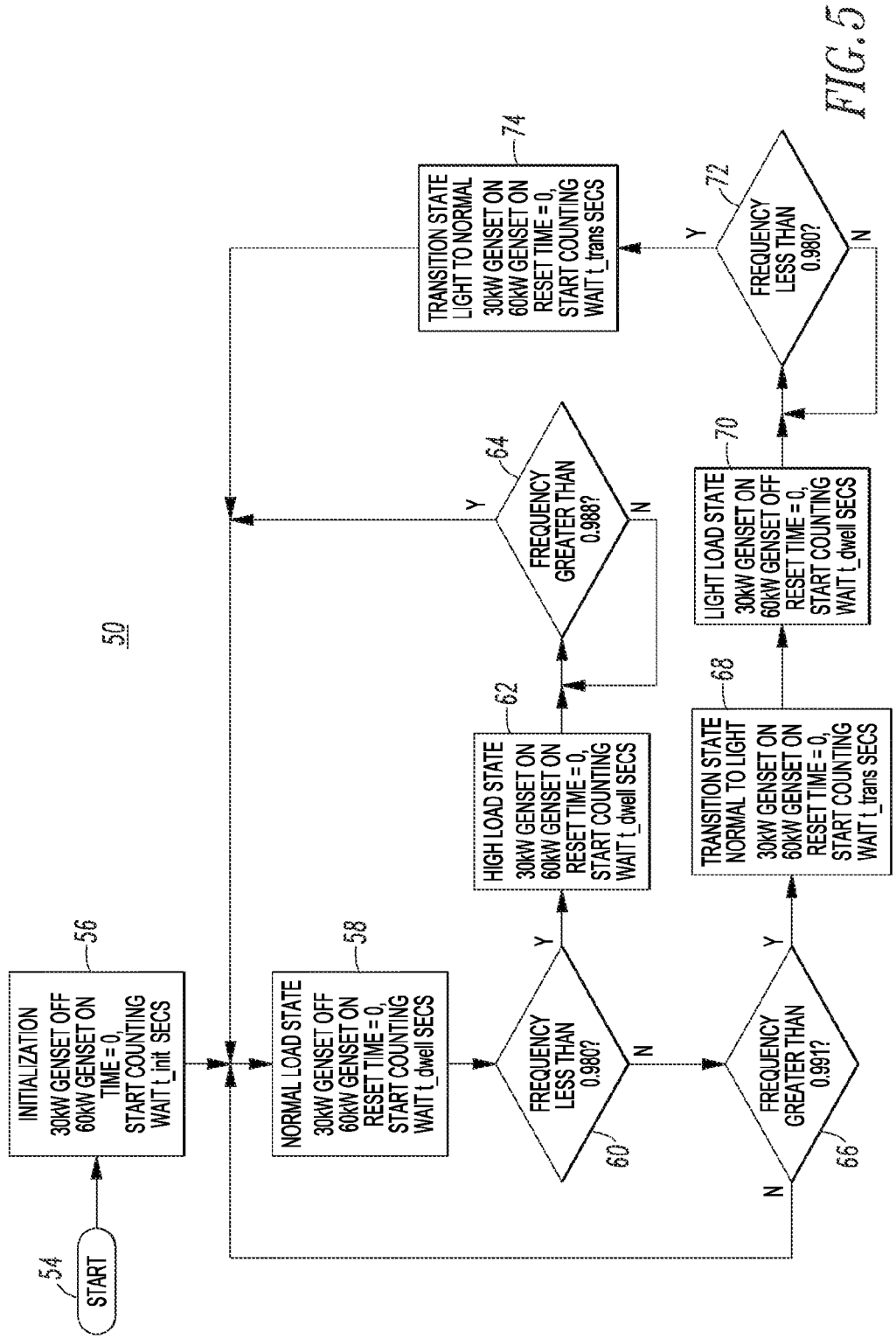
FIG. 5 is a flow chart of time-based control logic corresponding to the plot of FIG. 4.
Figure 11:
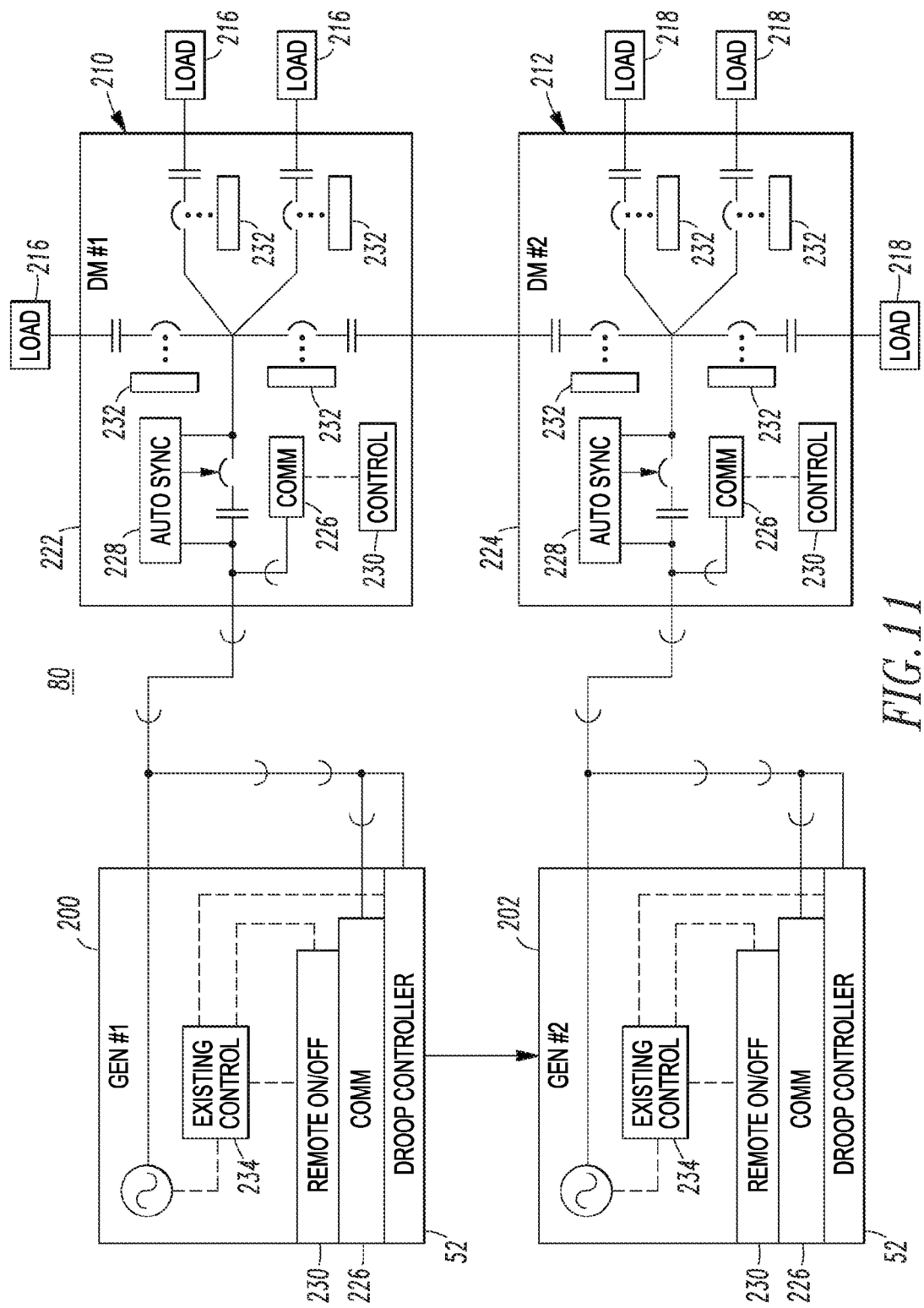
FIG. 11 is a control block diagram of the system of FIG. 10 including a distribution manager for each of the distribution nodes.

FIG. 5 shows a flow chart of time-based logic 50 for the disclosed concept, which can be executed by a suitable processor (e.g., without limitation, the control 230 of FIG. 11; a supervisory controller (not shown); an intelligent distribution manager (e.g., 222,224 of FIG. 11)). In the time-based logic 50, efficiency bands, thresholds, droop slopes and delays are preferably adjustable parameters. For example, t_init is the initial generator start-up time, t_dwell is the generator dispatching dwell time, t_trans is the generator dispatching transition time, and t_inv is the generator dispatching inverter time (see FIG. 7).

The logic 50 starts at 54. During initialization, at 56, the 60 kW generator is turned on, and the 30 kW generator is turned off. A timer (not shown) is initialized to zero and is started. Then, after a suitable predetermined time, t_init (e.g., without limitation, 5 seconds; any suitable time), execution resumes at 58, which is the "normal" load state (e.g., 30 kW to 60 kW in this example) with only the 60 kW generator turned on. Here, the timer is initialized to zero and is restarted. Then, after a suitable predetermined time, t_dwell (e.g., without limitation, 3 seconds; any suitable time), execution resumes at 60.

At 60, if the frequency (freq)<0.980, then a "high" load state (e.g., 60 kW to 90 kW) is entered at 62 with both 30 kW and 60 kW generators turned on. Here, the timer is initialized to zero and is restarted. Then, after a suitable predetermined time, t_dwell (e.g., without limitation, 3 seconds; any suitable time), execution resumes at 64. At 64, if the frequency (freq)>0.988, then the "normal" load state is reentered at 58 with only the 60 kW generator turned on and the 30 kW generator turned off. Otherwise, the test at 64 is repeated.

On the other hand, if the test at 60 is false, then at 66, if the frequency (freq)>0.991, then a transition state or "normal to light" state is entered at 68 with both of the 30 kW and 60 kW generators turned on. Here, the timer is initialized to zero and is restarted. Then, after a suitable predetermined time, t_trans (e.g., without limitation, 3 seconds; any suitable time), a "light" load state is entered at 70 with only the 30 kW generator turned on and the 60 kW generator turned off.

At 70, the timer is initialized to zero and is restarted. Then, after a suitable predetermined time, t_dwell (e.g., without limitation, 3 seconds; any suitable time), execution resumes at 72. At 72, if the frequency (freq)<0.980, then a transition state or "light to normal" state is entered at 74 with both of the 30 kW and 60 kW generators turned on. Here, the timer is initialized to zero and is restarted. Then, after a suitable predetermined time, t_trans (e.g., without limitation, 3 seconds; any suitable time), the "normal" load state is reentered at 58 with only the 60 kW generator turned on and the 30 kW generator turned off. Otherwise, the test at 72 is repeated.

Example 7

Figure 6:
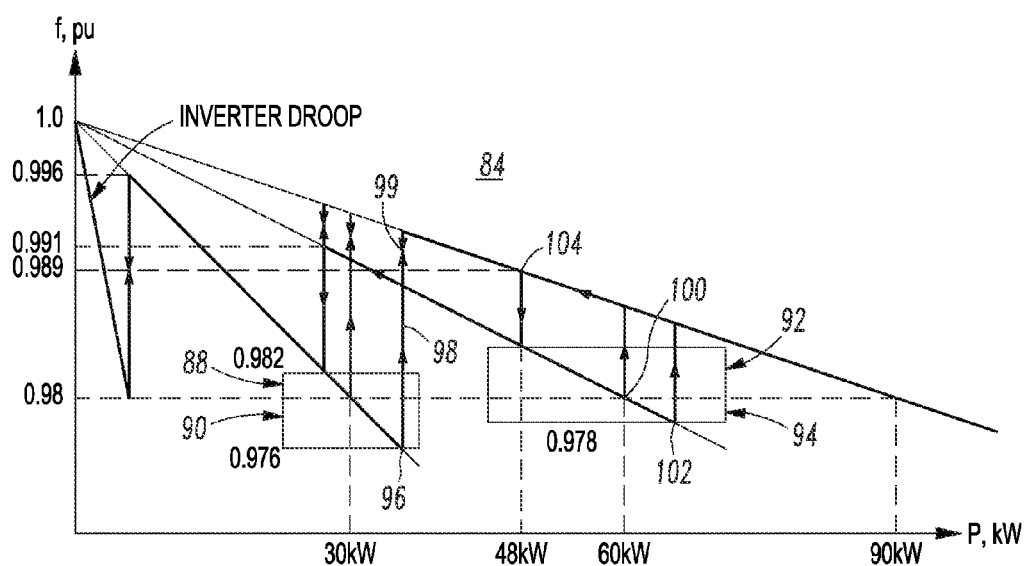
FIG. 6 is a plot of generator per unit frequency versus power for 30 kW and 60 kW generators for which control logic with multiple dispatching points and an energy store is employed in accordance with another embodiment of the disclosed concept.
Figure 10:
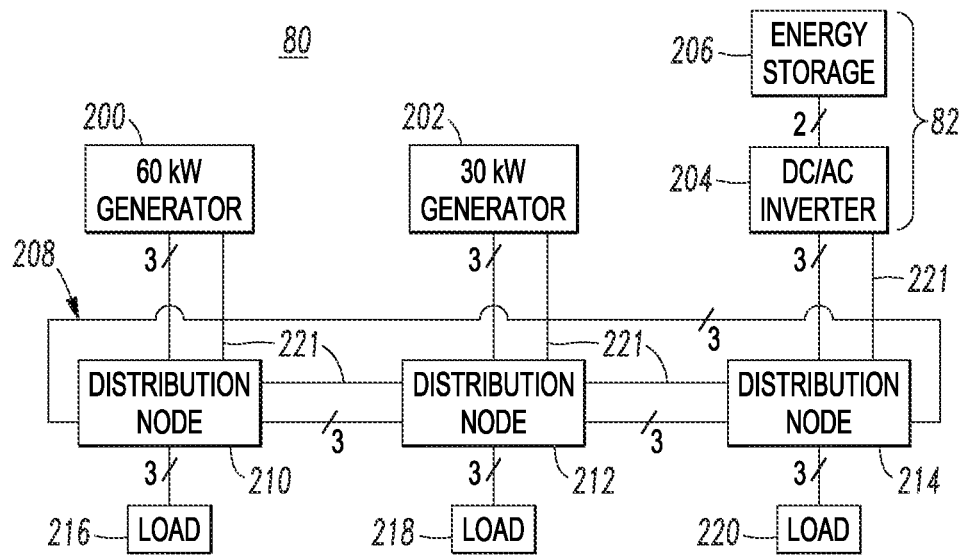
FIG. 10 is a simplified block diagram of a system including two generators, an energy storage system and a DC/AC inverter, a grid formed by plural distribution nodes, and plural loads in accordance with another embodiment of the disclosed concept.

The disclosed control strategy can be extended to a system 80 with an energy storage system 82 as shown in FIG. 10, in order to allow a wider operating range on the frequency droop lines 84 as shown in FIG. 6. This shows the results of control logic 86 (FIG. 7) with multiple dispatching points and with the energy storage system 82.

As shown in FIG. 6, an example four efficiency bands are employed: (1) a 90%-100% high efficiency band 88; (2) a 120% extended band 90, which includes BIM; (3) an 80%-100% high efficiency band 92; and (4) a 110% extended band 94, which includes BIM. At point 96, for example, at about 36 kW load or 120% (36 kW) of the load, with 100% for the 30 kW generator plus 20% for BIM, the frequency is starting to be less than the specified frequency with BIM (e.g., f, pu, of 0.976). Here, the 60 kW generator is turned on at 98. After a predefined time (t_trans), the 30 kW generator is turned off at 99 to allow more load power tolerance.

Without BIM, the 30 kW generator is turned on at 100 or 100% (60 kW) of the load for the 60 kW generator. However, with BIM, the 30 kW generator is turned on at 102 or 110% (66 kW) of the load, with 100% for the 60 kW generator plus 10% for BIM. The 30 kW generator is turned off at 104, which is 80% (48 kW) of the load for the 60 kW generator, or 53.33% (48 kW) of the load for both of the 30 kW and 60 kW generators.

Example 8

Figure 7:
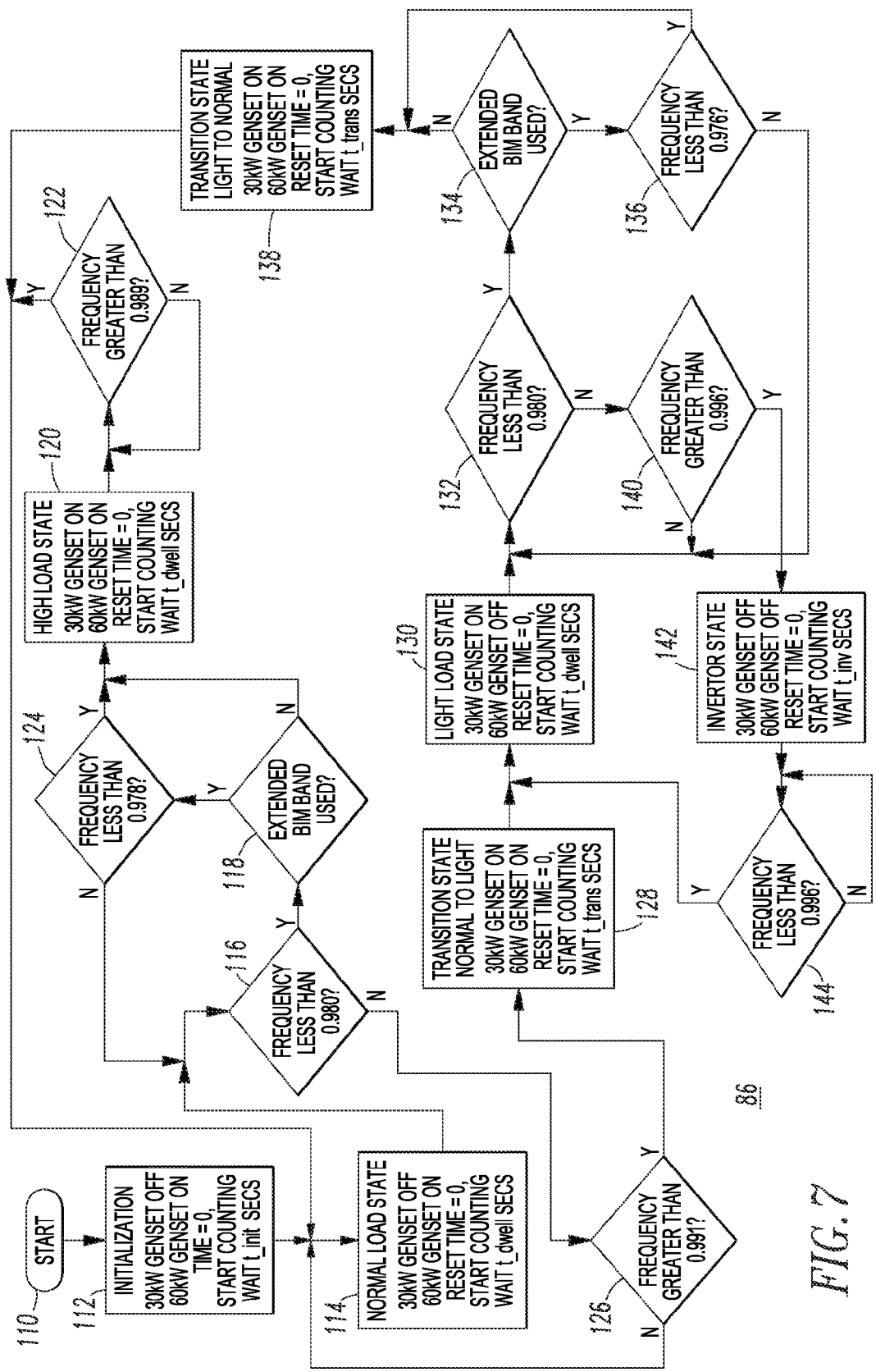
FIG. 7 is a flow chart of time-based control logic corresponding to the plot of FIG. 6.

FIG. 7 shows a flow chart of the time-based control logic 86 corresponding to the results of FIG. 6. The logic 86 starts at 110. During initialization, at 112, the 60 kW generator is turned on, and the 30 kW generator is turned off. A timer is initialized to zero and is started. Then, after a suitable predetermined time, t_init (e.g., without limitation, 5 seconds; any suitable time), execution resumes at 114, which is the "normal" load state (e.g., 30 kW to 60 kW in this example) with only the 60 kW generator turned on. Here, the timer is initialized to zero and is restarted. Then, after a suitable predetermined time, t_dwell (e.g., without limitation, 3 seconds; any suitable time), execution resumes at 116.

At 116, if the frequency (freq)<0.980, and if at 118 extended BIM is not being used, then a "high" load state (e.g., 60 kW to 90 kW) is entered with both 30 kW and 60 kW generators turned on at 120. Here, the timer is initialized to zero and is restarted. Then, after a suitable predetermined time, t_dwell (e.g., without limitation, 3 seconds; any suitable time), execution resumes at 122. At 122, if the frequency (freq)>0.989, then the "normal" load state is reentered at 114 with only the 60 kW generator turned on and the 30 kW generator turned off. Otherwise, the test at 122 is repeated. On the other hand, if extended BIM is being used at 118, then at 124, if the frequency (freq)<0.978, then the "high" load state is entered at 120, and, otherwise, the test at 116 is repeated.

On the other hand, if the test at 116 is false, then at 126, if the frequency (freq)>0.991, then a transition state or "normal to light" state is entered at 128 with both of the 30 kW and 60 kW generators turned on. Here, the timer is initialized to zero and is restarted. Then, after a suitable predetermined time, t_trans (e.g., without limitation, 3 seconds; any suitable time), a "light" load state is entered at 130 with only the 30 kW generator turned on and the 60 kW generator turned off. Otherwise, if the test failed at 126, then the "normal" load state is reentered at 114.

At 130, the timer is initialized to zero and is restarted. Then, after a suitable predetermined time, t_dwell (e.g., without limitation, 3 seconds; any suitable time), execution resumes at 132. At 132, if the frequency (freq)<0.980, and if extended BIM is being used at 134, and if the frequency (freq)<0.976 at 136, then a transition state or "light to normal" state is entered at 138 with both of the 30 kW and 60 kW generators turned on. Here, the timer is initialized to zero and is restarted. Then, after a suitable predetermined time, t_trans (e.g., without limitation, 3 seconds; any suitable time), the "normal" load state is reentered at 114 with only the 60 kW generator turned on and the 30 kW generator turned off. On the other hand, if extended BIM is not being used at 134, then the transition state or "light to normal" state is entered at 138. Otherwise, if the test failed at 136, then step 132 is repeated.

On the other hand, if the frequency (freq) is not less than 0.980 at 132, then at 140 it is determined if the frequency (freq)>0.996. If not, then the test at 132 is executed again.

Otherwise, if the frequency (freq) is greater than 0.996, then an "inverter" state is entered at 142 with both of the 30 kW and 60 kW generators turned off and power being supplied by BIM. Here, the timer is initialized to zero and is restarted. Then, after a suitable predetermined time, t_inv (e.g., without limitation, 3 seconds; any suitable time), it is determined at 144 if the frequency (freq)<0.996. If so, then the "light" load state is reentered at 130. Otherwise, the "inverter" state is reentered at 142.

Steps 118,124,134,136 correspond to the use of battery management (with BIM) with the extended bands 90,94 of FIG. 6, which include BIM.

Example 9

Figure 8:
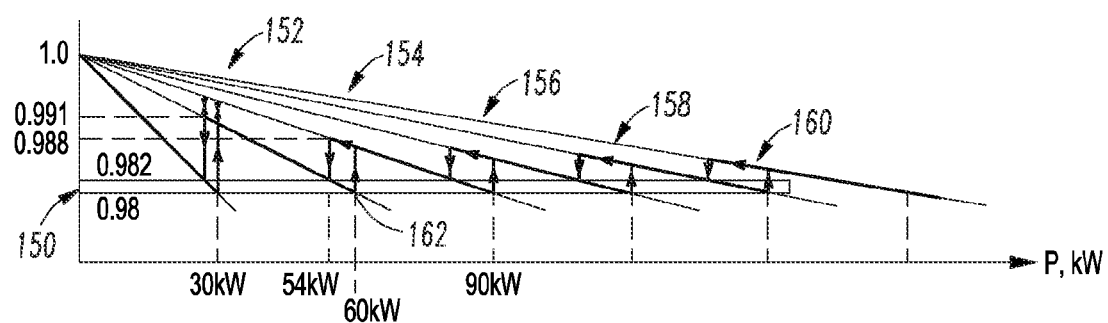
FIG. 8 is a plot of generator per unit frequency versus power for a number of 30 kW generators and zero or one 60 kW generator for multiple dispatching points, but without an energy store, in accordance with another embodiment of the disclosed concept.

FIG. 8 shows the results of control logic including a 90% efficiency band 150 with multiple dispatching points 152, 154,156,158,160, but without an energy storage system, in which combinations are shown for: (1) dispatching a 30 kW generator; (2) dispatching a 60 kW generator; (3) dispatching both 30 kW and 60 kW generators; (4) dispatching two 30 kW generators and one 60 kW generator; and (5) dispatching three 30 kW generators and one 60 kW generator. For example, at 162, the 30 kW generator is turned on at 60 kW (100%) of the 60 kW generator. Also, at 164, the 30 kW generator is turned off at 54 kW (60%) of the 30 kW and 60 kW generators.

Example 10

Figure 9:
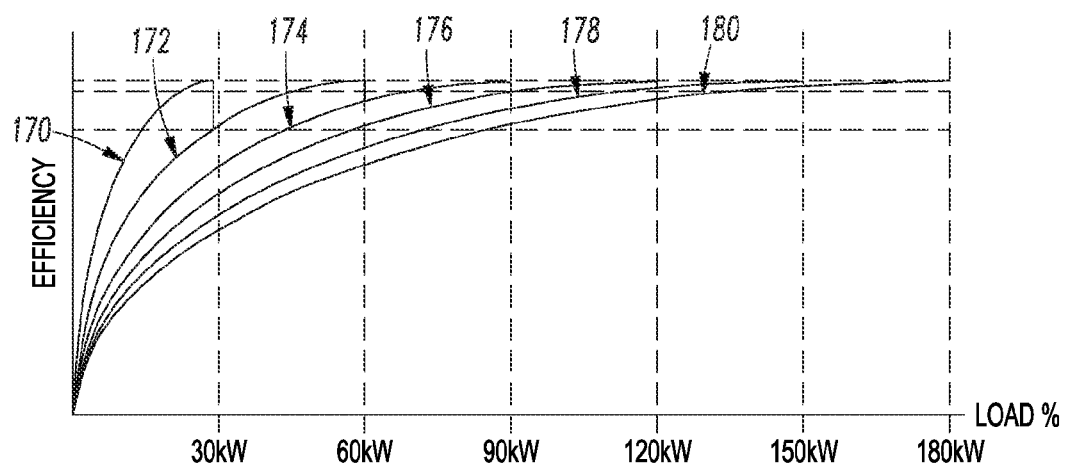
FIG. 9 is a plot of system efficiency versus power for a number of 30 kW generators and zero or one 60 kW generator for multiple dispatching points, but without energy store, in accordance with another embodiment of the disclosed concept.

FIG. 9 shows system efficiency versus load with: (1) a 30 kW generator 170; (2) a 60 kW generator 172; (3) both 30 kW and 60 kW generators 174; (4) two 30 kW generators and one 60 kW generator 176; (5) three 30 kW generators and one 60 kW generator 178; and (6) four 30 kW generators and one 60 kW generator 180.

Example 11

FIG. 10 is a simplified block diagram of the system 80 including two example generators 200,202, the energy storage system 82 including a DC/AC inverter or BIM 204 and a suitable energy store, such as a number of batteries 206. A grid 208 is formed by three example distribution nodes 210,212,214, and powers three example loads 216,218,220. In this example, the generators 200,202, the DC/AC inverter or BIM 204, the grid 208, the distribution nodes 210,212, 214, and the loads 216,218,220 are three-phase devices, although the disclosed concept is applicable to devices which have any suitable number of phases. The distribution nodes 210, 212 and 214 correspond to the respective generators 200, 202 and the DC/AC inverter or BIM 204. Although, one load 216, 218 or 220 is operatively associated with each of the distribution nodes 210,212,214, any suitable number of loads can be employed. A suitable communication channel 221 is provided for exchanging information between the generators 200,202, the DC/AC inverter or BIM 204, and the distribution nodes 210,212,214.

Example 12

FIG. 11 shows a control view for part of the system 80 of FIG. 10 in which a distribution manager (DM) 222,224 is provided for the respective distribution nodes 210,212. For convenience of illustration, the DC/AC inverter or BIM 204 and the corresponding distribution node 214 of FIG. 10 are not shown. It is to be understood, however, that a corresponding DM (not shown) is provided for the distribution node 214. Also, the same or different loads 216,218 or any suitable load can be employed in FIGS. 10 and 11.

The DMs 222,224 and generators 200,202 cooperatively function to provide: (1) adjustable load sharing by remote communications employing a communication module (COMM) 226 in each of the DMs 222,224 and generators 200,202; (2) automatic synchronization (AUTO SYNCH) 228 for hot plug-and-play of the corresponding generator 200 or 202; (3) remote start/stop control 230 of the corresponding generator 200 or 202; and (4) load management control 232. Additional control is added to the convention generator control 234 to provide generator functions for the droop controller 52.

Moreover, the efficiency of the overall system 80 can be maximized. The generators 200,202 are run at the highest efficiency most of the time for both the loads 216,218,220 (FIGS. 10 and 11) and energy storage charging through the energy storage system 82 (FIG. 10). The thresholds of the extended band can also be adjusted to automatically depend on the state of charge of the energy storage system 82. The control architecture can easily be expanded to multiple distributed generator systems as were discussed, above, in connection with FIGS. 8 and 9.

The control strategy for load management is accomplished through observation of the frequency of the grid 208 (FIG. 10). Variations in load demand create measurable fluctuations in frequency which, in the disclosed concept, are then associated with shedding of a number of loads or prohibiting additional load, in order to prevent network power quality issues. For example, based on default or configured load priorities, the control system sequentially dispatches loads based on a predetermined process accounting for network stability. The disclosed concept preferably focuses on operation in an islanded mode, namely, with no utility grid or utility connection.

Example 13

Figure 12:
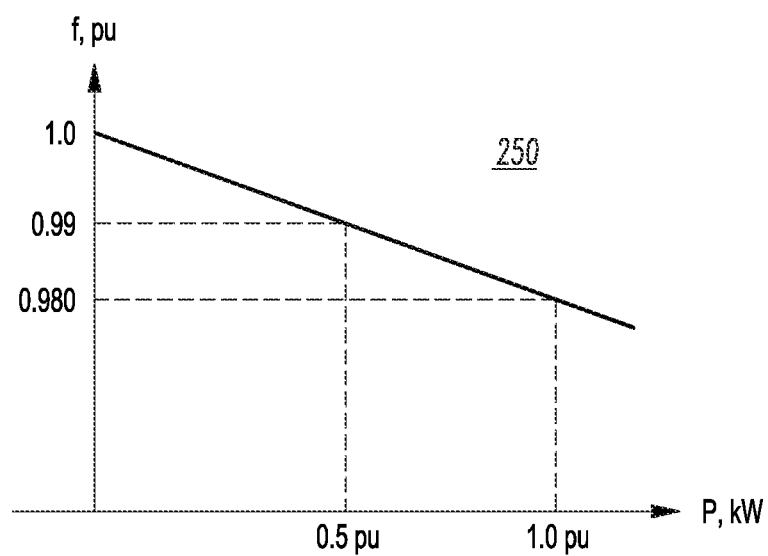
FIG. 12 is a plot of per unit frequency versus per unit power for a 2% droop.

Sources in a microgrid are operated with an overall power-frequency droop 250 as shown in FIG. 12, which facilitates real power sharing between the various sources, such as the example generators 200,202, and the DC/AC inverter or BIM 204 of FIG. 10. The various sources can have the same droop parameters, such that each generator 200,202 shares power according to its rating, for minimal fuel consumption, or may not have the same droop parameters. As the load increases, the frequency drops. Therefore, frequency can be used as an indication of the system load. Overloads can be detected using frequency, as shown in the example in FIG. 12, where a measured frequency below 0.98 pu indicates that the sources are outputting more than 1 pu of rated power. This frequency based load shedding preferably takes into account the frequency droop of the various sources during normal operation.

Example 14

In a microgrid with synchronous generators, such as 200 or 202 of FIG. 10, driven by internal combustion engines (ICEs) (not shown), application or rejection of a load results in a transient frequency drop. When a load is applied, more power is transferred from the rotor (not shown) than is input, and the rotor begins to slow down. The governor (not shown) detects the change in speed and increases the power to the rotor. Because of the relatively small inertia in the microgrid considered, this transient frequency drop may be larger than the normal operating frequency droop.

Figure 13:
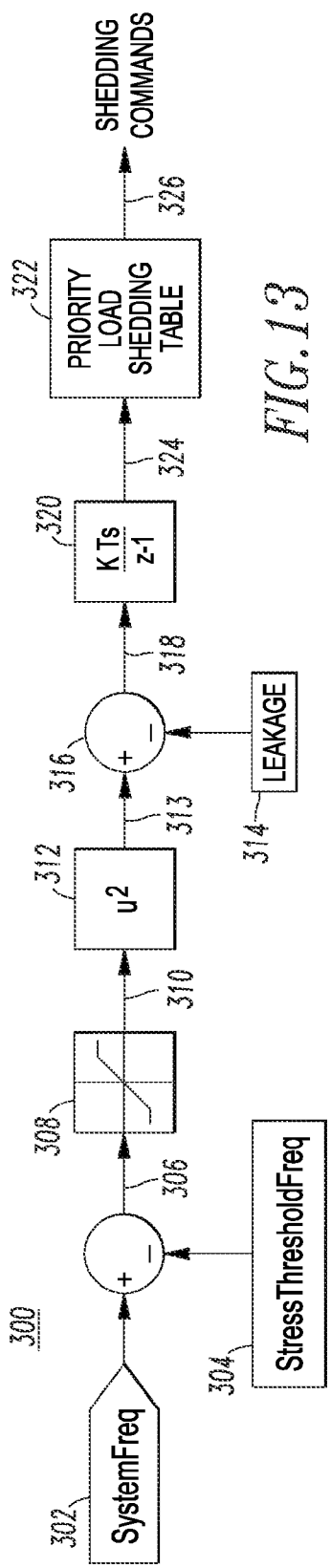
FIG. 13 is a block diagram of a load shedding algorithm including an under-frequency load shedding relay in accordance with another embodiment of the disclosed concept.

A load shedding algorithm 300 as shown in FIG. 13 preferably does not shed loads for transient frequency dips from which the system will recover. In the event of a severe overload, the corresponding ICE (not shown) may stall. In order to deal with this potential problem, frequency based load shedding preferably acts relatively quickly in the event of a severe overload, in order to prevent the stalling of generators and the resulting system collapse. In the disclosed microgrid, the generators preferably employ, for example and without limitation, diesel ICEs (not shown) which are over-rated by 50% to 100% in order to improve transient performance. In the case of an overload which may exceed the rating of the electrical machine, but not cause the generator to stall, load shedding need not happen immediately. In the case where demand based dispatching of generators is employed, the load shedding algorithm 300 is preferably sufficiently slow in order that another source may be brought online before any loads are shed. However, in the case of an emergency (e.g., a severe overload), loads are shed immediately in order to prevent the generators from stalling.

In accordance with the disclosed concept, an under-frequency load shedding relay, or "$F^2t$" relay measures the system frequency (SystemFreq) (F) 302 and compares it to a stress threshold (StressThresholdFreq) ($F_{THRESH}$) 304. The stress threshold 304 may be chosen, for example, to be the rated droop frequency (e.g., 0.98 pu in FIG. 12), or some other suitable value. The input value (i.e., input=system frequency−stress threshold frequency) 306 is fed into a saturation block 308 having an output 310 such that:

output=0 if (system frequency−stress threshold frequency)>=0, otherwise output=(system frequency−stress threshold frequency).

This output value is then fed through a function, such as a squaring function 312. A leakage term 314 is subtracted by subtraction function 316, and the result 318 is added to an accumulator, or a discrete-time integration function, 320. The accumulator 320 is normalized to a maximum value (not shown), and different loads (e.g., 216,218,220 of FIG. 10, or 216,218 of FIG. 11) can be assigned shedding thresholds by a priority load shedding table 322 based upon the accumulator value 324, and the loads can be shed by shedding commands 326 in the order of priority.

The load shedding algorithm 300 can be executed, for example and without limitation, by any suitable processor, such as the DG control 230 (FIG. 11) for the intelligent distribution managers 222,224 (FIG. 11) or for the distribution nodes 210,212,214 (FIG. 10), or by processor-based loads, such as 216,218,220 of FIG. 10 or 216,218 of FIG. 11, which can independently shed corresponding loads.

Example 15

For example, Table 1 shows high (H) and low (L) thresholds for six example normal loads (LP) and two example environmental control units (ECUs) (e.g., without limitation, air conditioning systems; HVAC; three-phase loads; loads which draw more current than normal loads).

TABLE 1

| Load or Unit High or Low Threshold | Threshold Value |
|---|---|
| ECU1_H | 0.25 |
| ECU1_L | 0.10 |
| LP1_H | 0.35 |
| LP1_L | 0.25 |
| LP2_H | 0.40 |
| LP2_L | 0.30 |
| LP3_H | 0.45 |
| LP3_L | 0.35 |
| LP4_H | 0.50 |
| LP4_L | 0.40 |
| LP5_H | 0.55 |
| LP5_L | 0.45 |
| LP6_H | 0.60 |
| LP6_L | 0.50 |
| ECU2_H | 0.75 |
| ECU2_L | 0.60 |

In this example, the ECU1 will be disconnected first when the accumulator value is larger than 0.25 and the ECU1 will be reapplied if the accumulator value 324 is less than 0.10. If the accumulator value 324 is relatively very large (e.g., without limitation, 0.57), then the ECU1, LP1, LP2, LP3, LP4 and LP5 will all be disconnected. Then, when the accumulator value 324 drops to, for example, 0.44, then LP5 will be reapplied.

Example 16

Many legacy generators are manually controlled and, as such, do not have the ability to interface with an autonomous operating microgrid as is disclosed herein. Hence, the interface of an intelligent distribution manager (e.g., 222, 224 of FIG. 11) with integrated control is employed, which can easily be retrofit into legacy generating systems and link with a microgrid communication bus (e.g., 221 of FIG. 10). Such a control device needs to be able to interface to legacy DG, such as the generators 200,202 of FIG. 10, and the DC/AC inverter 204 in a simple and direct manner. Existing generators have diverse control inputs and status outputs which are accessed by a microgrid grid controller. The control of a suitable intelligent distribution manager preferably interfaces to all of these DG and DER (Distributed Energy Resource) types.

The DG control 230 (FIG. 11) for the intelligent distribution manager 222,224 (FIG. 10) employs voltage and frequency droop control, which assures that the real and reactive power are shared equally among all the generators 200,202, based solely on local measurements. By applying droop slopes for control, the power flow of the DG is determined by the power demand of the loads 216,218,220. This ensures that the DG operates at the lowest capacity necessary. Remote start/stop capability 230 allows the microgrid intelligent distribution manager 222,224 to remotely turn on or turn off the corresponding generator 200,202. This functionality allows the DG to operate in a peak shaving mode when an energy storage system, such as 82 of FIG. 10, is employed. Essentially, the DG is operated at full load to charge the energy storage system 82 and supply the loads 216,218,220. When the energy storage system 82 is fully charged, the DG is turned off (e.g., the "inverter" state 142 of FIG. 7), and the loads 216,218,220 are supplied solely or partially from the energy storage system 82. When the energy storage system 82 is below a certain state-of-charge (SOC), the DG is turned on again, and the energy storage system 82 is charged while simultaneously supplying the loads. This enables the DG to operate with maximum possible fuel efficiency within the certainty of the disclosed efficiency bands.

Example 17

The leakage term 314 of FIG. 13 acts to deplete the accumulator 320 once the load has decreased and the frequency is restored above the stress threshold. Hysteresis, as shown above in Table 1, for example, is used for the reapplication of loads, based on the accumulator output 324.

Alternatively, frequency based load shedding can employ a suitably low frequency threshold, chosen to be lower than any expected transient frequency dip for emergency load shedding (e.g., with no time delay), and a stress threshold with a time delay for non-emergency load shedding. When the low frequency is observed, a number of the loads 216,218,220 (FIG. 10) are shed because the generators 200,202 are in the process of stalling. For non-emergency load shedding, a delay can be used, in order that the system frequency remains below the stress threshold for a predetermined period of time before loads are shed. Then, the loads can be shed sequentially until the frequency is restored above the stress threshold. The delay preferably accounts for the time needed for extra generation to be dispatched. In the case where extra generation cannot be dispatched for whatever reason, load shedding ensures that the remaining loads may still be served, instead of allowing the generators 200,202 to trip due to thermal overload.

Example 18

Figure 14:
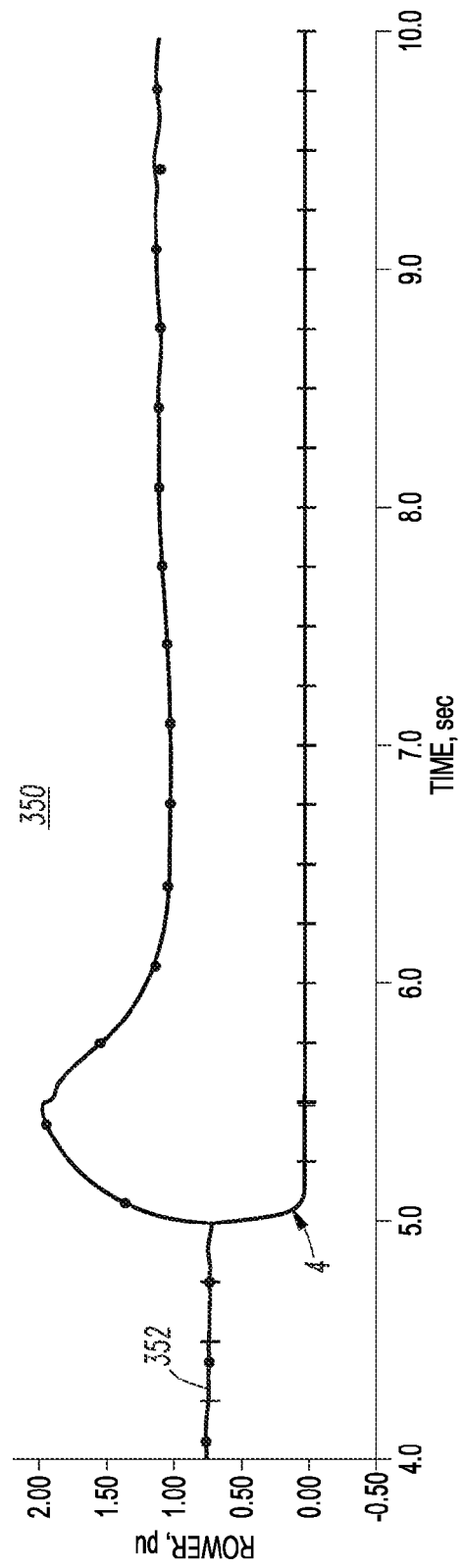
FIG. 14 is a plot of generator per unit power versus time for a system including 30 kW and 60 kW generators in which the 60 kW generator trips offline in accordance with another embodiment of the disclosed concept.

An example of load shedding is discussed in connection with FIG. 14. This shows a plot 350 of an example simulation of the disclosed "F²t" relay of the load shedding algorithm 300 of FIG. 13. In this simulation, one 30 kW diesel generator (not shown) and one 60 kW diesel generator (not shown) supply 70 kW 352 of load. At 5 seconds at 354, the 60 kW generator trips offline. This causes the remaining 30 kW generator, which has an over-rated diesel engine, to stall.

Example 19

Figure 15A:
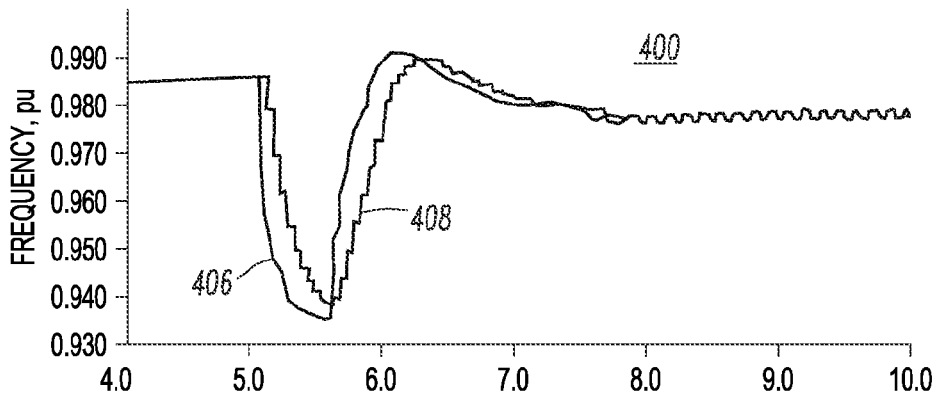
FIG. 15A is a plot of generator per unit frequency and filtered and sampled frequency versus time for the load shedding algorithm of FIG. 13.
Figure 15B:
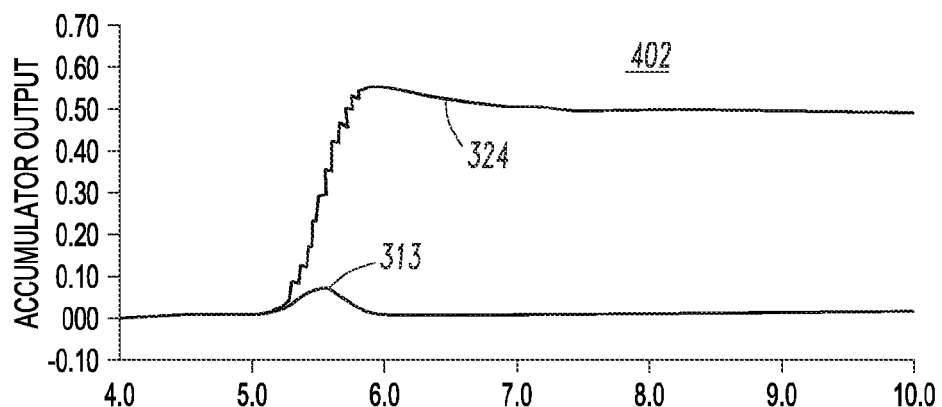
FIG. 15B is a plot of a normalized accumulator and a $(F-F_{THRESH})^2$ function versus time for the load shedding algorithm of FIG. 13.
Figure 15C:
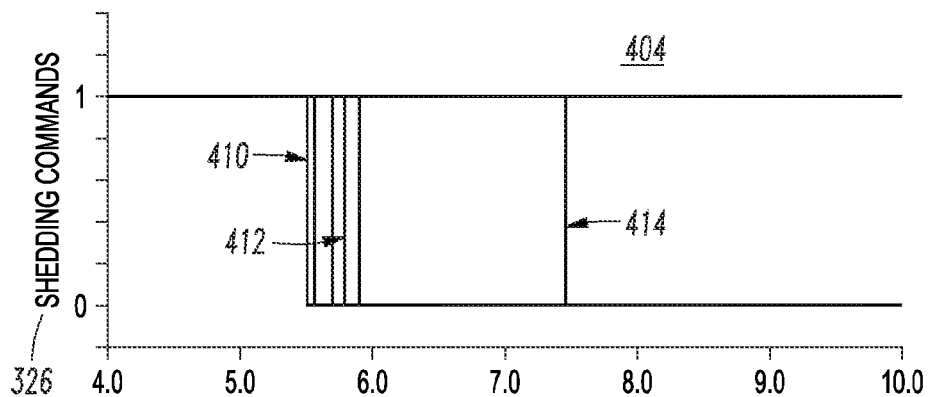
FIG. 15C is a plot of digital signals used to shed and restore loads versus time for the load shedding algorithm of FIG. 13.

FIGS. 15A-15C show respective plots 400,402,404 of a simulation of 30 kW and 60 kW diesel generators (not shown) operating, with the 60 kW generator tripping offline, thereby causing the 30 kW generator to begin to stall, and with low priority (LP) and HVAC loads being shed. In the plot 400 of FIG. 15A there is a plot 406 of generator frequency, in per unit, as well as a plot 408 of a filtered and sampled version of the frequency used by the load shedding algorithm 300 of FIG. 13.

The plot 402 of FIG. 15B shows the output 324 of the normalized accumulator 320 of FIG. 13, and the output 313 of the $(F-F_{THRESH})^2$ function 312.

The plot 404 of FIG. 15C shows various loads being shed (HVAC 410, LP 412), and after a few seconds, some loads (e.g., LP6 414) are reapplied after the system recovers. The vertical lines represent the timing of digital signals (shedding commands 326 of FIG. 13) used to shed and restore loads.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A generator dispatching control method for a microgrid, said method comprising:
   employing a plurality of generators having a plurality of different rated capacities;
   employing a plurality of distribution nodes;
   powering at least some of said distribution nodes by said generators;
   forming a grid by said distribution nodes, said grid including a system frequency;
   powering a plurality of loads by said grid through said distribution nodes, said loads having a power demand;
   operating by a processor said generators and said loads under transient conditions based upon a plurality of efficiency bands; and
   employing each of said efficiency bands for a corresponding one of said generators, each of said efficiency bands including a plurality of generator switching points based upon droop of said system frequency and the power demand of said loads.

2. The generator dispatching control method of claim 1 further comprising:
   powering at least some of said distribution nodes by an energy storage system.

3. The generator dispatching control method of claim 2 further comprising:
   dynamically modifying said efficiency bands based on availability of said energy storage system.

4. The generator dispatching control method of claim 2 further comprising:
   supporting by said energy storage system, based upon said efficiency bands, at least one of the different rated capacities of at least one of said generators; and
   delaying starting of another one of said generators, when said loads exceed the at least one of the different rated capacities of said at least one of said generators.

5. The generator dispatching control method of claim 2 further comprising:
   employing as said energy storage system an energy storage and a DC/AC inverter or battery interface module.

6. The generator dispatching control method of claim 2 further comprising:
   employing an extended efficiency band operatively associated with said energy storage system; and
   automatically adjusting thresholds of said extended efficiency band to depend on a state of charge of said energy storage system.

7. A microgrid power generation system comprising:
   a plurality of generators having a plurality of different rated capacities;
   a plurality of distribution nodes, at least some of said distribution nodes being powered by said generators;
   a grid formed by said distribution nodes, said grid including a system frequency;
   a plurality of loads powered by said grid through said distribution nodes, said loads having a power demand; and
   a processor including a plurality of efficiency bands, each of said efficiency bands being for a corresponding one of said generators and including a plurality of generator switching points based upon droop of said system frequency and the power demand of said loads, said processor being structured to operate said generators and said loads under transient conditions based upon said efficiency bands.

8. The microgrid power generation system of claim 7 wherein at least one of said distribution nodes is powered by an energy storage system.

9. The microgrid power generation system of claim 8 wherein said processor is further structured to cause at least one of said generators to operate at or close to a corresponding at least one of the different rated capacities, thereby simultaneously supplying said loads and charging said energy storage system, followed by turning off said generators and supplying said loads from said energy storage system.

10. The microgrid power generation system of claim 7 wherein said processor is further structured to provide a predetermined response delay for said system frequency to settle at a corresponding operating point before turning on one of said generators.

11. The microgrid power generation system of claim 7 wherein said processor is further structured to shed a number of said loads if the system frequency droops at a rate exceeding a predetermined value, and to reconnect a number of said number of loads following recovery of said system frequency.

12. The microgrid power generation system of claim 7 wherein said processor is further structured to adjust said efficiency bands, a number of thresholds, a number of frequency droop slopes and a number of delays.

13. The microgrid power generation system of claim 8 wherein said processor is further structured to provide a first normal state for said loads and a second state for said loads, said second state requiring less power than said first normal state, a first transition from said first normal state to said second state, and a second transition from said second state to said first normal state.

14. The microgrid power generation system of claim 13 wherein said processor is further structured to provide a third state for said loads, said third state requiring greater power than said first normal state, and a fourth inverter state; and wherein when said processor turns off said generators, said energy storage system supplies power to said loads.

15. The microgrid power generation system of claim 7 wherein said generators include a first generator having a first rated capacity of said different rated capacities and a second generator having a second rated capacity of said different rated capacities, said second rated capacity being two times greater than said first rated capacity; wherein said processor is further structured, when said second generator is turned on, to turn on the first generator when the power demand of said loads is 100% of the second rated capacity of said second generator, to turn off the first generator when the power demand of said loads is less than 100% of the second rated capacity of said second generator; wherein said processor is further structured, when said second generator is turned on, to turn on the first generator when the power demand of said loads is less than the first rated capacity of said first generator and, after a predetermined time, to turn off the second generator; and wherein said processor is further structured, when said second generator is turned off, to turn on the second generator when the power demand of said loads increases to the first rated capacity of said first generator.

* * * * *